(No Model.) 2 Sheets—Sheet 1.
J. KIRBY, Jr.
DASH ELECTRIC HEADLIGHT.
No. 589,783. Patented Sept. 7, 1897.
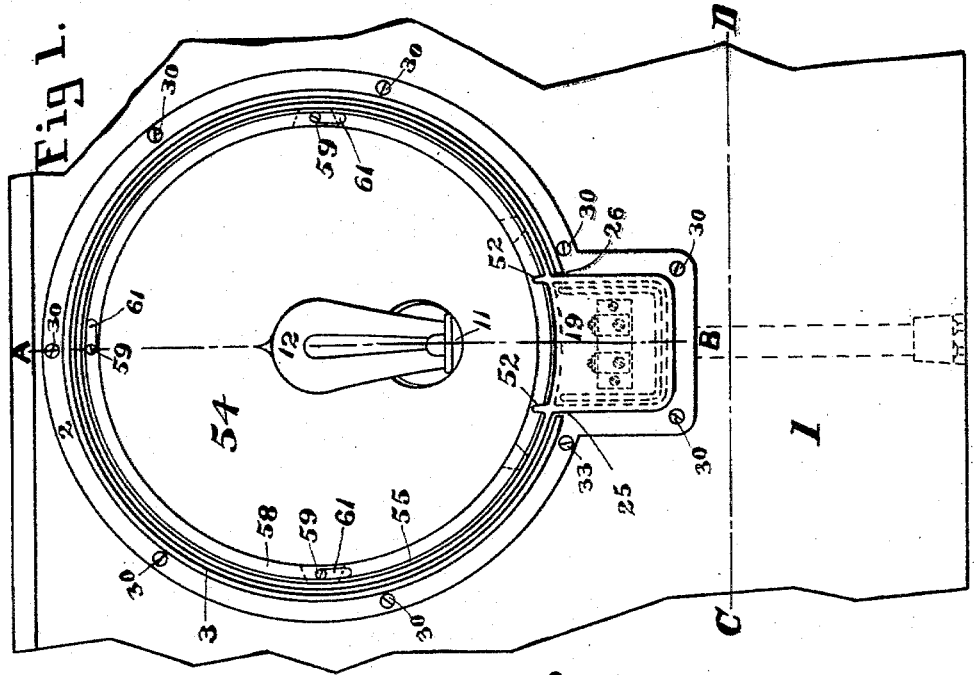
Fig. 1.
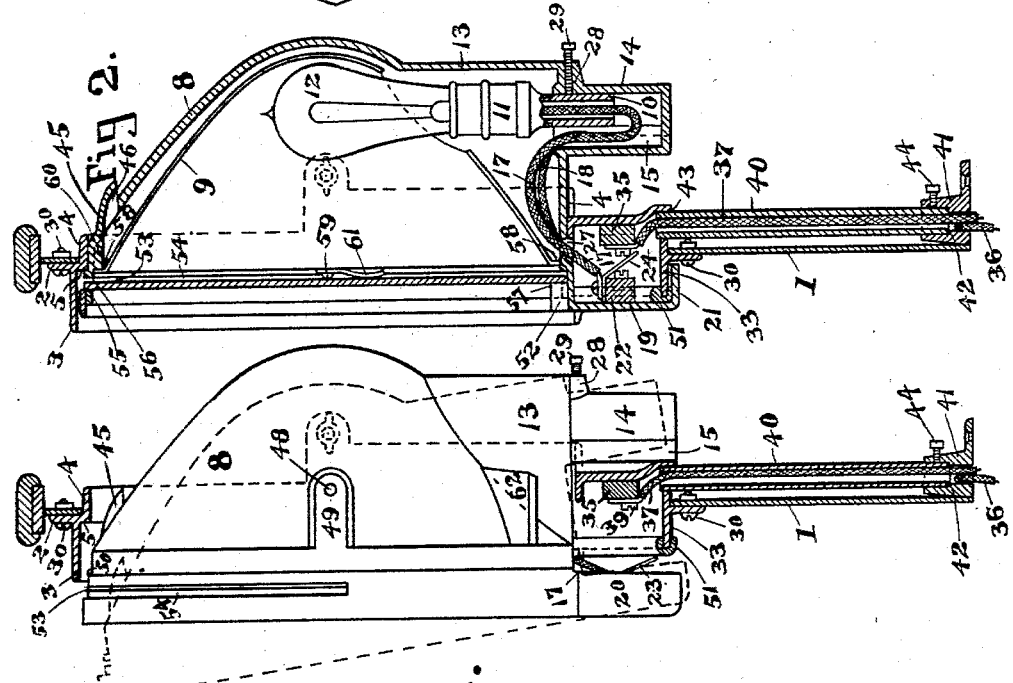
Fig. 2.
Fig. 3.
Attest.
E. B. Lehman
W. G. Mitchell
Inventor.
John Kirby Jr

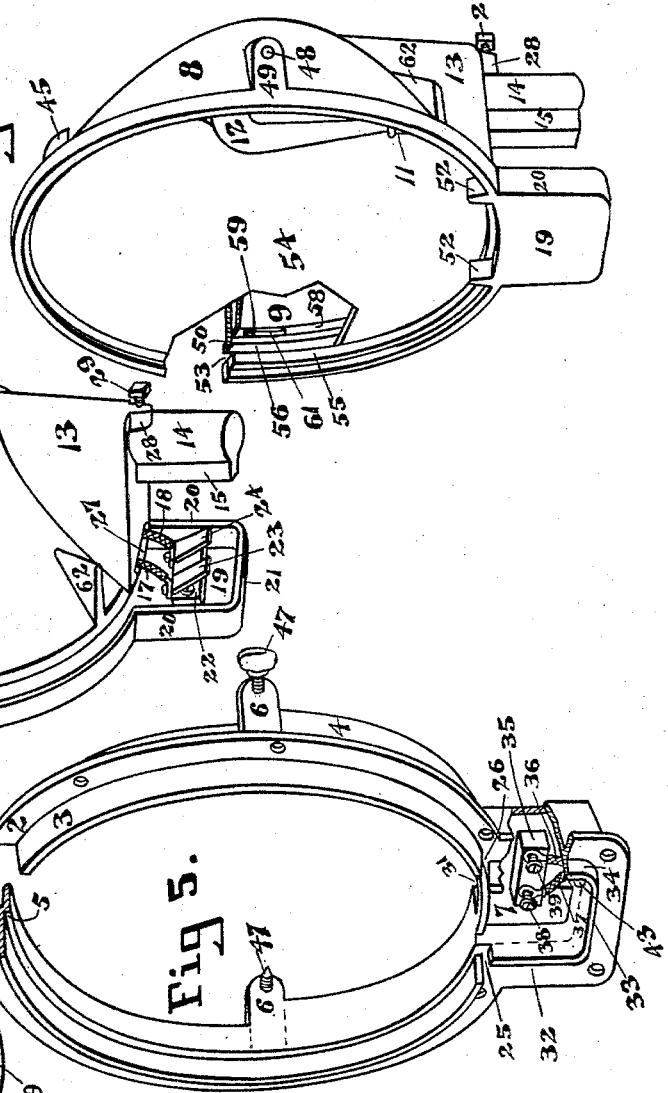
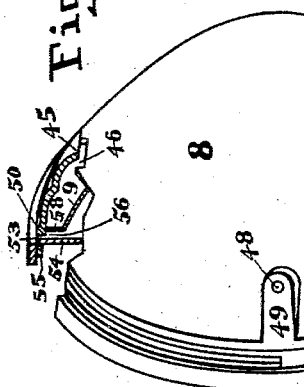
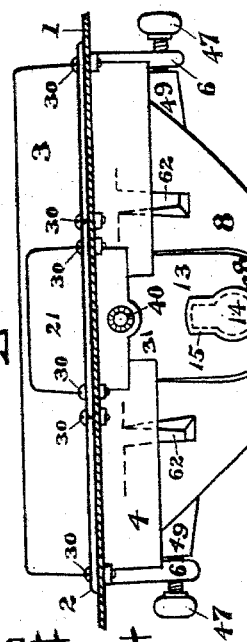

UNITED STATES PATENT OFFICE.

JOHN KIRBY, JR., OF DAYTON, OHIO, ASSIGNOR TO THE UNITED STATES HEAD-LIGHT COMPANY, OF UTICA, NEW YORK.

DASH ELECTRIC HEADLIGHT.

SPECIFICATION forming part of Letters Patent No. 589,783, dated September 7, 1897.

Application filed February 10, 1897. Serial No. 622,796. (No model.)

*To all whom it may concern:*

Be it known that I, JOHN KIRBY, Jr., a citizen of the United States, residing at Dayton, in the county of Montgomery and State of Ohio, have invented certain new and useful Improvements in Dash Electric Headlights; and I do hereby declare that the following is a full, clear, and exact description of the invention.

My invention relates to electric headlights for street and other railway or railroad cars, and has reference to the type which are carried by the dash thereof and which have heretofore been supported thereon by means of brackets that hook into loops attached to the outside of the dashboard or by securing the headlight permanently to the outside thereof or by inserting it through an opening cut in the dashboard and permanently securing it therein and thereto, all of which modes of attachment are objectionable for the reason that when the headlight is supported on the outside of the dashboard it is frequently damaged and often entirely destroyed by collision with other cars, vehicles, and otherwise, and when permanently secured to the front of the dashboard or within an opening cut through the same too much time and labor are required to remove the headlight when for any purpose it is desired to do so, and which frequently becomes necessary and is often desirable—as, for example, on street-railways, where both ends of the cars are used as "head ends," two headlights being required for each car when the headlights are permanently anchored to the dashboards.

One object of my invention is to remove these objections by providing a headlight which is adapted to be set into the dashboard in such manner as that it will have but a slight projection in front thereof and that it may be easily and quickly attached to and detached from its support, and that too without the necessity of removing bolts or screws, as must be done in order to remove such type of headlights when they are permanently anchored to the dashboard.

Another object is to provide protection to the front glass of the headlight.

Another object is to provide means for connecting the electric current with the lamp when the headlight is placed in position and disconnecting it when the headlight is removed, and a further object is to combine with such a detachable headlight means for adjusting the lamp to proper relation with the focal point of the reflector, together with certain other improvements, all of which I accomplish in the manner hereinafter fully described, as pointed out in the claims and as shown in the accompanying drawings, in which—

Figure 1 is a front view of the headlight mounted in the dashboard, the conduit through which the current-conveying wires pass from the floor of the car to the lamp being shown by dotted lines and the dashboard being broken away at both sides of the headlight; Fig. 2, a sectional view of the headlight and its appurtenances, taken through line A B of Fig. 1; Fig. 3, a sectional view of the dashboard and the supporting-frame, taken on the line A B of Fig. 1, showing the headlight in elevation and moved forward to permit of its being tilted, as indicated by dotted lines, in which position it can be removed from or inserted in its supporting-frame; Fig. 4, a bottom view as seen through the line C D of Fig. 1; Fig. 5, a broken perspective view of the supporting-frame; Fig. 6, a rear broken perspective view of the headlight removed from its supporting-frame, and Fig. 7 a front perspective view of the same.

Similar reference-numerals indicate corresponding parts in all the figures.

1 represents the dashboard of a street-car, through which an opening is cut to receive and to which is permanently attached a supporting-frame mainly consisting of a dash-flange 2, a front projecting flange 3, and a rear projecting flange 4, forming a shoulder 5 and having ears 6, the whole terminating at the bottom in a pocket 7, as clearly shown in Fig. 5, and for the purposes hereinafter explained.

The headlight consists chiefly of a casing 8, a parabolic or other-shaped reflector 9, a lamp-socket holder 10, a lamp-socket 11, and an incandescent electric lamp 12. The case is preferably made of cast metal and in a single piece with a housing 13, forming a part of the bottom thereof and having a depending pocket 14, in which the lamp-socket holder 10 is movable and communicating at one side thereof with a pocket 15 to accommodate current-conveying wires 17 18, which lead from a pocket or recess formed by an extension 19, depending from the bottom of the front of the case and having side and bottom flanges 20 21, within which pocket is secured an insulating-block 22, to which are connected spring-contacts 23 24, connecting with the said current-conveying wires leading therefrom through an opening 27 into the housing 13, thence down into the pocket 15 and upwardly through the lamp-socket holder 10 to the lamp-socket 11, where contact with the lamp is formed in the usual manner. The rear of the pocket 14 is provided with a boss or projection 28, through which a set-screw 29 operates, the end of which impinges against the socket-holder 10 to secure it in place when the lamp has been adjusted to proper position with relation to the focal point of the reflector. The frame is permanently fixed to the dashboard by means of bolts 30 or otherwise, and its rear flange 4 may be reduced in width above its horizontal center line, as shown. The bottom of this flange is cut away at 31 to allow the headlight-case to be moved forward to the position shown in Fig. 3, when it can be removed from or placed in position within the frame, as shown in Fig. 2. The lower portion of the front flange 3 is cut away at 25 26 to receive the side walls 20 and is reduced in width at 32 33 34, and this reduced portion forms a part of the bottom and of the side walls of the pocket 7, to the back of which an insulating-block 35 is attached, to which current-conveying wires 36 37 are connected by means of screws 38 39, against the heads of which (when the headlight is in position as shown in Fig. 2) the spring-contacts 23 and 24 impinge, thus forming a connection between the wires 17 36 and 18 37, in a manner which will be fully understood by those familiar with electrical appliances.

The wires 36 and 37 lead upwardly from underneath the car-platform through a conduit 40, (preferably a piece of gas-pipe,) the lower end of which is supported in a bored base 41, screwed to the floor thereof and provided with a shoulder 42, formed by a reduced bore through the lower portion of said base, the said shoulder serving to prevent the possibility of the conduit slipping through the floor and causing damage to the machinery under the car. The upper end of the conduit enters a hole 43 in the bottom of the pocket 7 of the dash-frame and the lower end is held firmly in place by a set-screw 44. The case 8 is provided with a cap 45, covering an opening 46, whose function is that of a ventilator. Thumb-screws 47, having their ends pointed, as shown, operate through the ears 6 of the dash-frame, and when the headlight is in position the pointed ends of these screws engage holes 48 in lugs 49, formed on the case, the centers of which holes are located slightly forward of the centers of the screws, so that when the latter engage the former their taper ends will come in contact with the rear side of said holes and in screwing to place will draw the shoulder 50, formed on the case, closely against the shoulder 5 of the dash-frame, and whereby the complete headlight will be securely held in place within said frame and connection made between wires 17 18 and 36 37, as hereinbefore explained.

When the headlight is in position, the pocket or recess formed by the flanges 19, 20, and 21 incases the pocket 7 of the supporting-frame, and the current-conveying wires, together with their respective contacts, are thereby protected from the elements, and as an additional protection a rubber or other elastic packing 51 may be interposed to prevent the possibility of water entering the pockets or recesses and causing what is known as "short circuit." The side flanges 20 of the pocket of the case 8 extend above the outer rim of the case, as shown at 52, the function of these extensions being to direct water which may run down on the inside of the front of the rim of the case away from the pockets. An opening or slot 53 is cut through the upper half of the case to receive a circular glass 54, through which the light is transmitted and which protects the reflector and lamp in the usual manner. A ring 55 forms a bearing for the edge of the glass on the front side thereof, a shoulder or offset 56 of the case forming a similar bearing on the rear side of the glass below the horizontal center line of the case, which shoulder is continued above said horizontal center line by the thickness of the case-wall, whereby a groove 57 is formed around the inner rim of the case to receive the glass, the said groove having a bottom formed by the rim of the case below its horizontal center line and being an open slot above said line.

The glass 54 can be removed or replaced by loosening the thumb-screws 47 and drawing the headlight forward until the glass clears the flange 3 of the dash-frame, which when the headlight is in place forms a covering for the glass-opening, and, extending, as it does, beyond the front of the headlight, also protects it from damage.

The reflector 9 is provided with an annular flange 58 and is secured within the case by a suitable number of screws 59 to lugs 60, Fig. 2, formed on the inside thereof. Springs 61 are attached to the annular flange of the reflector, the function of which is to press the glass against the ring 55 and thus prevent rattling. Lugs 62 are built up from the case 8, which, in conjunction with the lower half of the lugs 49, form suitable extended bearings for the case when the headlight is mounted within the dash-frame.

From the foregoing it will be observed that one of my improved headlights will suffice for each car whether one or both ends of the car are used as head end, and, furthermore, that railway companies having a surplus number of cars need not purchase a headlight for each car, as their supply can be limited to the number of cars in actual service, the surplus cars requiring only the dash-frame, into any of which any of the headlights can be quickly inserted without stopping to connect or disconnect the current-conveying wires, resulting in many instances in very considerable saving and convenience to railway companies.

I have described what I now consider to be the best manner of detail construction; but it is obvious that such details may be departed from in various ways without departing from the spirit of my invention, and I therefore do not limit myself to such exact construction. It is also apparent that certain features of my invention may be used to the exclusion of others and the features so used come within the scope of the invention.

I claim—

1. As an improvement in dash electric headlights, the combination with the dashboard of a railway-car having an opening cut through said dashboard below the top thereof, of an open headlight-frame registering with said opening and secured to said dashboard, and a headlight-case containing a reflector; a lamp-socket; a lamp-socket holder; and an incandescent electric lamp held in said lamp-socket, the said headlight-case being carried by said frame and detachably held therein.

2. As an improvement in dash electric headlights, the combination with the dashboard of a railway-car having an opening cut through said dashboard below the top thereof, of an open headlight-frame registering with said opening and secured to said dashboard, and a headlight having a reflector provided with an opening in its side, a lamp-socket registering with said opening in the reflector, a lamp-socket holder and an incandescent electric lamp held in said lamp-socket, the headlight being carried by said headlight-frame and detachably held therein substantially as set forth.

3. A headlight-supporting frame adapted to register with an opening cut through the dashboard of a railway-car and to be secured thereto, said frame being provided with a pocket within which ends of current-conveying wires leading from a source of electrical supply are secured, in combination with a headlight detachably held in said frame, said headlight having a pocket within which ends of current-conveying wires leading to a lamp-socket are secured and means for connecting said wires when the headlight is placed in position within said frame and for disconnecting the same when the headlight is removed therefrom, substantially as and for the purpose set forth.

4. A headlight-supporting frame adapted to register with an opening cut through the dashboard of a railway-car, and to be secured thereto, in combination with a headlight detachably held in said frame, the headlight being provided with a socket-holder, a lamp-socket, current-conveying wires whose ends lead to said lamp-socket for connection therewith, a suitable pocket within which the opposite ends of said wires are secured, and means for forming a connection between said wires and corresponding current-conveying wires leading from a source of electrical supply to within a suitable recess adjacent to said supporting-frame, whereby the headlight may be bodily set in said frame and removed therefrom and said wires thereby connected and disconnected, substantially as and for the purpose set forth.

5. A headlight-supporting frame adapted to register with an opening cut through the dashboard of a railway-car and to be secured thereto, in combination with a headlight detachably held in said frame, the headlight being provided with an adjustable socket-holder through which current-conveying wires lead to a lamp-socket to which their ends are connected and a pocket within which the opposite ends of said wires are secured and means for forming a connection between said wires and corresponding current-conveying wires leading from a source of electrical supply to within a suitable recess adjacent to said supporting-frame, whereby the headlight may be bodily set in said frame and removed therefrom and said wires thereby connected and disconnected, substantially as and for the purpose set forth.

6. As an improvement in dash electric headlights, the combination with the dashboard of a railway-car having an opening cut through said dashboard below the top thereof, of an open headlight-frame registering with said opening and secured to said dashboard; said frame having a flange projecting forward of the dashboard and beyond the face of the headlight; to protect the latter from damage, and a headlight-case containing a reflector; a lamp-socket; a lamp-socket holder; and an incandescent electric lamp held in said lamp-socket, the headlight being carried by said headlight-frame and detachably held therein, substantially as set forth.

7. A headlight-supporting frame adapted to register with an opening cut through the dashboard of a railway-car below the top thereof and to be secured thereto, in combination with a headlight having a reflector provided with an opening in its side, a lamp-socket registering with said opening in the reflector, a lamp-socket holder and an incandescent electric lamp held in said lamp-socket, the headlight being detachably held in said supporting-frame, and the latter having a flange projecting forward of and beyond the face of the headlight to protect it from damage substantially as set forth.

8. As an improvement in dash electric headlights, the combination with the dashboard of a railway-car having an opening cut through said dashboard, of a headlight-supporting frame registering with said opening and secured to said dashboard, and a headlight-case having a reflector secured therein provided with an opening in its side, a lamp-socket registering with said opening in the reflector, a lamp-socket holder, and an incandescent electric lamp held in said lamp-socket, the said case having a slot cut through the upper half thereof forward of the reflector to receive a glass and a groove formed in its lower half, said groove constituting a seat for the glass, the said case being detachably held in the supporting-frame, substantially as set forth.

9. A headlight-supporting frame adapted to register with an opening cut through the dashboard of a railway-car and to be secured thereto, in combination with a headlight detachably held in said frame, said headlight having a slot cut through the upper half of its case forward of the reflector to receive a glass and a groove formed in the lower half of said case, said groove constituting a seat for the glass, and springs located behind the glass, substantially as and for the purpose set forth.

10. In combination with the dashboard of a railway-car having an opening cut through the same, a headlight-supporting frame registering with said opening and secured to said dashboard, a headlight provided with a lamp-socket, a lamp-socket holder, a pocket and a set of current-conveying wires leading from the socket to within said pocket, said headlight being detachably held in said frame, a set of current-conveying wires leading from a source of electrical supply to a suitable pocket adjacent to said frame, a conduit through which the latter set of wires pass from the platform of the car to said latter pocket and means for connecting said two sets of wires when the headlight is placed in position in said frame and for disconnecting the same when the headlight is removed, substantially as and for the purpose set forth.

11. As an improvement in dash electric headlights, the combination with the dashboard of a railway-car having an opening cut through said dashboard below the top thereof, of an open headlight-frame registering with said opening and secured to said dashboard, a headlight having a reflector provided with an opening in its side; a lamp-socket registering with said opening in the reflector; a lamp-socket holder; and an incandescent electric lamp held in said lamp-socket, the headlight being carried by said headlight-frame and detachably held therein, current-conveying wires leading from said frame to underneath the car-platform, and a conduit extending from said frame to the car-platform and through which conduit said wires pass, substantially as set forth.

JOHN KIRBY, JR.

Witnesses:
C. U. RAYMOND,
H. D. HENDRICK.